(12) United States Patent
Piirainen et al.

(10) Patent No.: US 11,387,871 B2
(45) Date of Patent: Jul. 12, 2022

(54) REGULARIZATION OF COVARIANCE MATRIX AND EIGENVALUE DECOMPOSITION IN A MIMO SYSTEM

(71) Applicant: Nokia Technologies Oy, Espoo (FI)

(72) Inventors: Olli Piirainen, Oulu (FI); Jaakko Vihriälä, Oulu (FI); Ori Shental, Holmdel, NJ (US); Sivarama Venkatesan, Holmdel, NJ (US); Juha Myllylä, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/407,698

(22) Filed: Aug. 20, 2021

(65) Prior Publication Data

US 2022/0060220 A1 Feb. 24, 2022

(30) Foreign Application Priority Data

Aug. 21, 2020 (FI) ..................................... 20205815

(51) Int. Cl.
| | |
|---|---|
| H04L 5/12 | (2006.01) |
| H04B 7/0426 | (2017.01) |
| H04B 17/345 | (2015.01) |
| H04B 7/0456 | (2017.01) |
| G06F 17/16 | (2006.01) |

(52) U.S. Cl.
CPC ........... *H04B 7/043* (2013.01); *H04B 7/0456* (2013.01); *H04B 17/345* (2015.01); *G06F 17/16* (2013.01)

(58) Field of Classification Search
CPC .... H04B 7/043; H04B 7/0456; H04B 17/345; G06F 17/16

USPC ........................................................ 375/262
See application file for complete search history.

(56) References Cited

U.S. PATENT DOCUMENTS 10,609,714 B2 * 3/2020 Fakoorian ............ H04B 7/0456
10,637,544 B1    4/2020 Shattil
2006/0291596 A1 12/2006 Piirainen
(Continued)

FOREIGN PATENT DOCUMENTS

WO    WO 2017/093740 A2    6/2017

OTHER PUBLICATIONS

FI Search Report of Dec. 15, 2020 in Corresponding Application FI 20205815.

(Continued)

*Primary Examiner* — Helene E Tayong
(74) *Attorney, Agent, or Firm* — Fay Sharpe LLP

(57) ABSTRACT

A technique is provided including at least obtaining a noise and interference covariance matrix, performing scaling of the noise and interference covariance matrix, determining a sum of diagonal elements of the scaled noise and interference covariance matrix, performing a first spectral shift by the sum to the scaled noise and interference covariance matrix to obtain a first spectral shifted matrix, performing eigenvalue decomposition to the first spectral shifted matrix to obtain an eigenvalue matrix, performing a second spectral shift by the sum to the eigenvalue matrix, limiting the eigenvalue matrix to a diagonal matrix, and obtaining a new noise and interference covariance matrix adding the scaled noise and interference covariance matrix and eigenvalue pairs that are obtained based, at least partly, on the performed eigenvalue decomposition.

15 Claims, 7 Drawing Sheets

(56) References Cited

U.S. PATENT DOCUMENTS

2009/0310724 A1* 12/2009 Shah ................ H04L 25/03006
375/346
2012/0108194 A1 5/2012 Lindqvist et al.
2018/0070364 A1* 3/2018 Varanese ............ H04W 72/046

OTHER PUBLICATIONS

Pietikäinen, K. et al. System-level performance of interference suppression receivers in LTE System, 2012 IEEE 75th Vehicular Technology Conference (VTC Spring), Yokohama, Japan: IEEE [online], May 2012, [retrieved on Dec. 9, 2020]. Retrieved from <https://ieeexplore.ieee.org/document/6239969>, <DOI:10.1109/VETECS.2012.6239969>.

Yang, S. et al. Interference modeling and performance evaluation for BS MMSE-IRC receiver in LTE-A Release 13, 2016 19th International Symposium on Wireless Personal Multimedia Communications (WPMC), Shenzhen, China: IEEE [online], Nov. 2016, ISSN 1882-5621, [retrieved on Dec. 9, 2020]. Retrieved from <https://ieeexplore.ieee.org/document/7954486>.

Shariati Nafiseh et al, "Robust Training Sequence Design for Correlated MIMO Channel Estimation", IEEE Transactions on Signal Processing, IEEE, USA, vol. 62, No. 1, Oct. 4, 2013 (Oct. 4, 2013), pp. 107-120, XP011533302, ISSN : 1053-587X, 001: 10.1109/TSP.2013.2284763 [retrieved on Dec. 5, 2013] Section II.

* cited by examiner

REGULARIZATION OF COVARIANCE MATRIX AND EIGENVALUE DECOMPOSITION IN A MIMO SYSTEM

FIELD

The following exemplary embodiments relate to wireless communication and MIMO systems in which multiple transmission and receiving antennas are utilized to exploit multipath propagation to multiply link capacity.

BACKGROUND

Multiple input, multiple output, MIMO, signal transmission technology may be used to improve spectral efficiency and quality of communications by using multiple transmitter and receiver antennas for transmitting signals at the same time and frequency. As adjacent cells in cellular communication networks utilizing MIMO may cause interference, receivers may be utilized that suppress the interference signals.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to one aspect there is provided an apparatus for use in a MIMO receiver, the apparatus comprising means for obtaining a noise and interference covariance matrix, performing scaling of the noise and interference covariance matrix, determining a sum of diagonal elements of the scaled noise and interference covariance matrix, performing a first spectral shift by the sum to the scaled noise and interference covariance matrix to obtain a first spectral shifted matrix, performing eigenvalue decomposition to the first spectral shifted matrix to obtain an eigenvalue matrix, performing a second spectral shift by the sum to the eigenvalue matrix, limiting the eigenvalue matrix to a diagonal matrix, and obtaining a new noise and interference covariance matrix adding the scaled noise and interference covariance matrix and eigenvalue pairs that are obtained based, at least partly, on the performed eigenvalue decomposition.

According to another aspect there is provided an apparatus for use in a MIMO receiver, the apparatus comprising at least one processor, and at least one memory including a computer program code, wherein the at least one memory and the computer program code are configured, with the at least one processor, to cause the apparatus to: obtain noise and interference covariance matrix, perform scaling of the noise and interference covariance matrix, determine a sum of diagonal elements of the scaled noise and interference covariance matrix, perform a first spectral shift by the sum to the scaled noise and interference covariance matrix to obtain a first spectral shifted matrix, perform eigenvalue decomposition to the first spectral shifted matrix to obtain an eigenvalue matrix, perform a second spectral shift by the sum to the eigenvalue matrix, limit the eigenvalue matrix to a diagonal matrix, and obtain a new noise and interference covariance matrix adding the scaled noise and interference covariance matrix and eigenvalue pairs that are obtained based, at least partly, on the performed eigenvalue decomposition.

According to another aspect there is provided a computer-implemented method comprising obtaining a noise and interference covariance matrix, performing scaling of the noise and interference covariance matrix, determining a sum of diagonal elements of the scaled noise and interference covariance matrix, performing a first spectral shift by the sum to the scaled noise and interference covariance matrix to obtain a first spectral shifted matrix, performing eigenvalue decomposition to the first spectral shifted matrix to obtain an eigenvalue matrix, performing a second spectral shift by the sum to the eigenvalue matrix, limiting the eigenvalue matrix to a diagonal matrix, and obtaining a new noise and interference interference covariance matrix adding the scaled noise and interference covariance matrix and eigenvalue pairs that are obtained based, at least partly, on the performed eigenvalue decomposition.

According to another aspect there is provided a computer program product readable by a computer and, when executed by the computer, configured to cause the computer to execute a computer process comprising obtaining a noise and interference covariance matrix, performing scaling of the noise and interference covariance matrix, determining a sum of diagonal elements of the scaled noise and interference covariance matrix, performing a first spectral shift by the sum to the scaled noise and interference covariance matrix to obtain a first spectral shifted matrix, performing eigenvalue decomposition to the first spectral shifted matrix to obtain an eigenvalue matrix, performing a second spectral shift by the sum to the eigenvalue matrix, limiting the eigenvalue matrix to a diagonal matrix, and obtaining a new noise and interference covariance matrix adding the scaled noise and interference covariance matrix and eigenvalue pairs that are obtained based, at least partly, on the performed eigenvalue decomposition.

According to another aspect there is provided a computer program product comprising computer-readable medium bearing computer program code embodied therein for use with a computer, the computer program code comprising code for performing obtaining a noise and interference covariance matrix, performing scaling of the noise and interference covariance matrix, determining a sum of diagonal elements of the scaled noise and interference covariance matrix, performing a first spectral shift by the sum to the scaled noise and interference covariance matrix to obtain a first spectral shifted matrix, performing eigenvalue decomposition to the first spectral shifted matrix to obtain an eigenvalue matrix, performing a second spectral shift by the sum to the eigenvalue matrix, limiting the eigenvalue matrix to a diagonal matrix, and obtaining a new noise and interference covariance matrix adding the scaled noise and interference covariance matrix and eigenvalue pairs that are obtained based, at least partly, on the performed eigenvalue decomposition.

According to another aspect there is provided a computer program product comprising instructions for causing an apparatus, wherein the apparatus is for use in a MIMO receiver, to perform at least the following: obtain a noise and interference covariance matrix, perform scaling of the noise and interference covariance matrix, determine a sum of diagonal elements of the scaled noise and interference covariance matrix, perform a first spectral shift by the sum to the scaled noise and interference covariance matrix to obtain a first spectral shifted matrix, perform eigenvalue decomposition to the first spectral shifted matrix to obtain an eigenvalue matrix, perform a second spectral shift by the sum to the eigenvalue matrix, limit the eigenvalue matrix to a diagonal matrix, and obtain a new noise and interference covariance matrix adding the scaled noise and interference covariance matrix and eigenvalue pairs that are obtained based, at least partly, on the performed eigenvalue decomposition.

According to another aspect there is provided a computer readable medium comprising program instructions for causing an apparatus, wherein the apparatus is for use in a MIMO receiver, to perform at least the following: obtain a noise and interference covariance matrix, perform scaling of the noise and interference covariance matrix, determine a sum of diagonal elements of the scaled noise and interference covariance matrix, perform a first spectral shift by the sum to the scaled noise and interference covariance matrix to obtain a first spectral shifted matrix, perform eigenvalue decomposition to the first spectral shifted matrix to obtain an eigenvalue matrix, perform a second spectral shift by the sum to the eigenvalue matrix, limit the eigenvalue matrix to a diagonal matrix, and obtain a new noise and interference covariance matrix adding the scaled noise and interference covariance matrix and eigenvalue pairs that are obtained based, at least partly, on the performed eigenvalue decomposition.

According to another aspect there is provided a non-transitory computer readable medium comprising program instructions for causing an apparatus, wherein the apparatus is for use in a MIMO receiver, to perform at least the following: obtain a noise and interference covariance matrix, perform scaling of the noise and interference covariance matrix, determine a sum of diagonal elements of the scaled noise and interference covariance matrix, perform a first spectral shift by the sum to the scaled noise and interference covariance matrix to obtain a first spectral shifted matrix, perform eigenvalue decomposition to the first spectral shifted matrix to obtain an eigenvalue matrix, perform a second spectral shift by the sum to the eigenvalue matrix, limit the eigenvalue matrix to a diagonal matrix, and obtain a new noise and interference covariance matrix adding the scaled noise and interference covariance matrix and eigenvalue pairs that are obtained based, at least partly, on the performed eigenvalue decomposition.

LIST OF DRAWINGS

In the following, the invention will be described in greater detail with reference to the embodiments and the accompanying drawings, in which FIG. 1 illustrates an exemplary embodiment of a radio access network.

DESCRIPTION OF EMBODIMENTS

Figure 1:
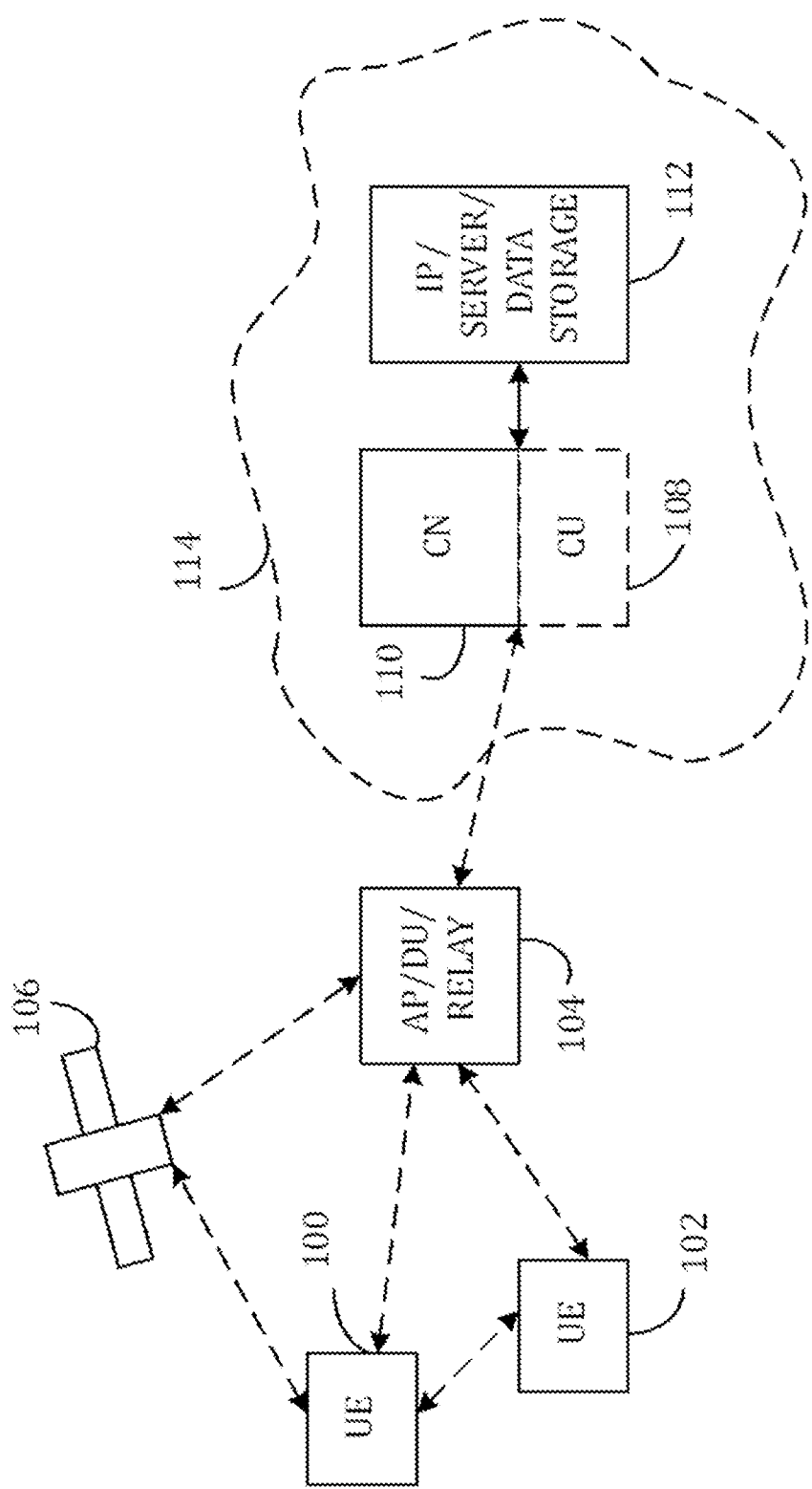

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require to bring the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases comprise providing service continuity for machine-to-machine (M2M) or Internet of Things (IoT) devices or for passengers on board of vehicles, and/or ensuring service availability for critical communications, and/or future railway/maritime/aeronautical communications. Satellite communication may utilise geostationary earth orbit (GEO) satellite systems, but also low earth orbit (LEO) satellite systems, for example, mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized. HAPS may be understood as radio stations located on an object at an altitude of 20-50 kilometres and at a fixed point relative to the Earth. For example, broadband access may be delivered via HAPS using lightweight, solar-powered aircraft and airships at an altitude of 20-25 kilometres operating continually for several months for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g)nodeBs), a home node B gateway, or HNB-GW (not shown in FIG. 1). A HNB Gateway (HNB-GW), which may be installed within an operator's network may aggregate traffic from a large number of HNBs back to a core network.

In a MIMO system used in a cellular communication network, a transmitter may transmit multiple signals using multiple transmit antennas. The transmitted signals propagate through a matrix channel in which the number of transmit antennas is $N_R$ and $N_L$ is the number of layers. The receiver then may obtain the received signal vectors by the multiple receive antennas and decode the received signal vectors into the original information. If there are $N_R$ receive antennas, the received signal may be formulated using the equation y=Hx+z, in which H is the effective channel matrix and may be defined as H=GW, G being the channel and W being the precoding or beamforming matrix, x is the transmitted signal and z being a noise vector.

A receiver may be a minimum mean square error interference rejection combining, MMSE-IRC, receiver which mitigates effects of interference signals and increase throughput. The MMSE-IRC receiver may be comprised in a terminal device. An MMSE-IRC receiver may be able to use multiple receiver antennas to create points, that are in the arrival direction of the interference signal, where antenna gain drops and use those to suppress an interference signal. In an example, the MMSE-IRC reception may be formulated as $\hat{x}=(H^H R^{-1}H+I)R^{-1}H^H$ in which $R \in \mathbb{C}^{N_R \times N_R}$ is the noise and interference covariance matrix, which is formally defined as $R=E[zz^H]$. A covariance matrix may be understood as a matrix in which diagonal components express the variance of each variable in a set of variables and in which other elements express a degree of correlation between two variables with respect to their direction. Yet, in some examples, a more beneficial way to estimate the noise and interference covariance matrix may be achieved by averaging over subcarriers and OFDM symbols using the below equation $$R = \frac{1}{|\mathcal{F}|}\sum_{\mathcal{F}}(y - H\hat{x})(y - H\hat{x})^H$$

A matrix may be factorized into a canonical from in which the matrix is represented in terms of its eigenvalues and eigenvectors. In other words, eigenvalue decomposition may be performed. Yet, the matrix is to be a diagonalizable matrix. Eigenvalue decomposition, EVD, of a Hermitean symmetric, positive semidefinite matrix may be defined as $$R = VDV^H = \sum_{n=1}^{N}\lambda_n v_n v_n^H$$

where V is the matrix of eigenvectors on each column, and D=diag($\lambda_1, \ldots, \lambda_N$) is the diagonal matrix of eigenvalues on the diagonal. V and D may be estimated using various methods. An example of such methods is the so-called power iteration method in which the following is repeatedly calculated $$x \leftarrow \frac{Rx}{\|Rx\|}.$$

This converges to the eigenvector corresponding to the largest eigenvalue, which may then be calculated as $\lambda_n = x^H Rx$. The effect of the largest eigenpair may now be subtracted as follows: $R \leftarrow R - (Rx)x^H$. The procedure may then be repeated with the new R to estimate the second largest eigenpair and so on.

The noise and interference covariance matrix R as defined above may be utilized in a receiver and in algorithms relating to the receiver. However, if the R is estimated by averaging, inverting it may become unstable in case the averaging period is not long enough since R is not of the form $R=\sigma^2 I+S$, in which $\sigma^2$ is noise variance, I is an identity matrix and S is a positive semidefinite matrix. Therefore, methods with high complexity may have to be used to overcome the potential stability issue. Further, power iteration based EVD may have slow convergence meaning that large number of iterations are needed to be calculated. If the largest eigenvalues are close to each other, even higher number of iterations may be needed. Thus, it would be beneficial to be able to approximate the covariance matrix R in a manner that allows its inverse to be more stable.

An inverse covariance matrix may be understood a precision matrix that indicated partial correlations of variables. In other words, a correlation between two variables may be obtained once other variables are conditioned using an inverse covariance matrix.

Power iteration based EVD algorithms estimate the largest eigenvalues and corresponding eigen vectors. Yet, to achieve a noise and interference covariance matrix R the inversion of which is more stable, it is beneficial to estimate the smallest eigen values of R instead of the largest. To achieve this, a spectral shift may be utilized to transform the covariance matrix R such that the largest eigenvalues of the transformed matrix may be estimated, and the inverse operation is stabilized.

Figure 2:
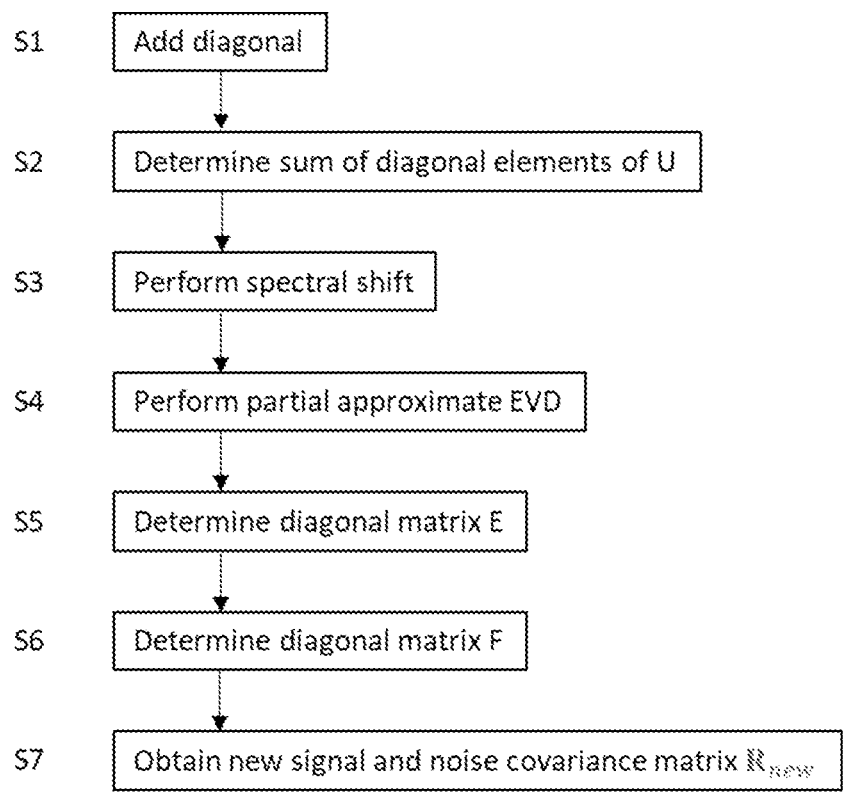
FIG. 2 illustrates a flow chart according to an exemplary embodiment.

FIG. 2 illustrates a flow chart according to an exemplary embodiment. The flow chart exemplifies a legalization algorithm. A legalization algorithm may be understood as modification or regulation of a covariance matrix. First, at S1, a scaled diagonal matrix is added to matrix R. This can be defined as $U=\beta\sigma^2 I+R$, in which $\beta$ is an optimization parameter, which may be 0, or may be set to small positive value. Next, in S2, a sum of diagonal elements of U is determined by performing a calculation that may be defined as s=sum (diag(U)). In S3 then a spectral shift is performed, and the spectral shift may be defined as T=sI−U. Next, in S4, Eigenvalue decomposition, EVD, is performed to the matrix. This may also be performed as a partial approximate EVD and may be defined as [V,D]=evd(T). In S5 a diagonal matrix E is determined and in S6 a diagonal matrix F is determined and thereby the values of the transformed eigenvalues are limited. The diagonal matrix E may be determined using the equation E=sI−D, and with $e_i$ on i'th diagonal. The diagonal matrix F may be determined using the equation F=diag(max($\sigma^2-e_i$,0)). In S7, output, which is the new noise and interference covariance matrix $R_{new}$ is formed by adding the original scaled R, which is U, and the calculated eigenpairs. The $R_{new}$ may be defined as $R_{new}=U+VFV^H$.

Figure 3:
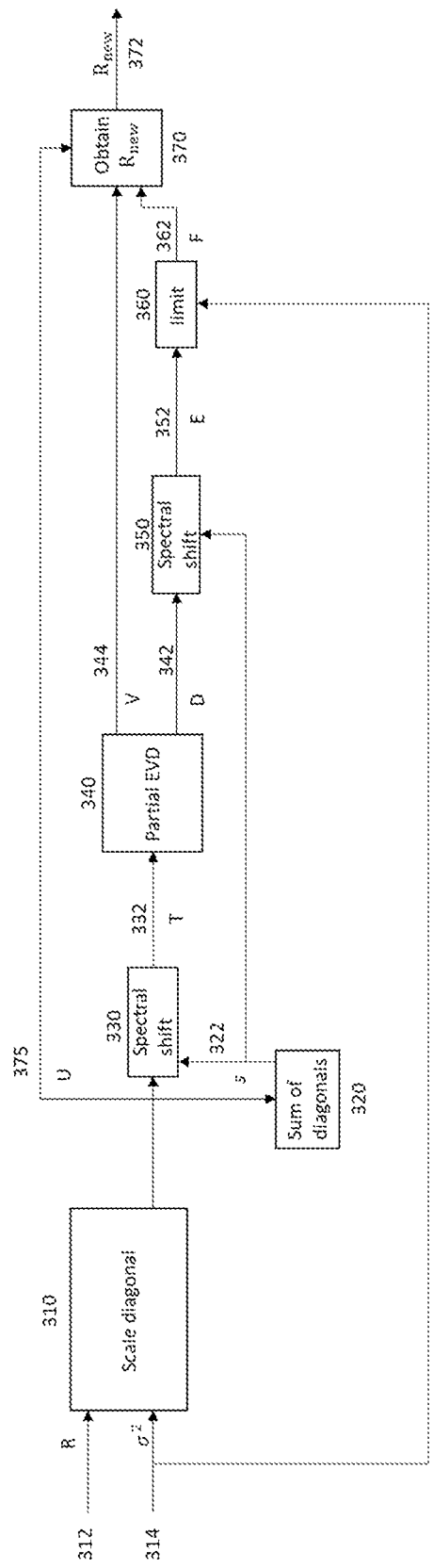
FIG. 3 and FIG. 4 illustrate block diagrams according to exemplary embodiments.

FIG. 3 illustrates an exemplary embodiment of a block diagram that corresponds to the legalization algorithm described in FIG. 2. Block 310 corresponds to S1 in which a scaled diagonal is added to the noise and interference covariance matrix R. The input 312 is the noise and interference covariance matrix R and the input 214 is the noise variance $\sigma^2$. The block 320 corresponds to S2 in which a sum of the diagonals is calculated. The input 375 provided to block 320 is the scaled R, U. Block 330 corresponds to S3 in which a spectral shift is performed. Input 322 provided to the block 330 is the output from the block 320 which is the sum s of the diagonals. In block 340, which corresponds to S4, the EVD may be performed to the matrix T that is the output 332 from the block 330. The EVD may be a partial EVD. The output 344 and 342 of the block 340 correspond to the largest eigenpairs. The output 332 is provided to block 350 that corresponds to S5 in which a second spectral shift is performed to obtain the output 352 that is a diagonal matrix E. The second spectral shift is performed by s that is the output 332 from the block 320. The output 352 is then provided to the block 360 that corresponds to S6. In block 360 the diagonal matrix E is limited such that the output 362 that is a diagonal matrix F is obtained. The limitation may be performed using the input 314. In block 370, which corresponds to S7, the new noise and interference covariance matrix $R_{new}$, which is the output 372 of the block 370, is obtained based on inputs 375, 344 and 362.

The EVD performed in block 340 that corresponds to S4 is done to the matrix T. Due to the spectral shift performed in block 330, that corresponds to S3, there may be several eigenvalues close to each other. If there are several eigenvalues close to each other that may results in ordinary power method having slow convergence. To overcome the possible slow convergence the following equation, that describes an update rule, may provide a useful basis:

$$w_{t+1}=(R-\alpha w_t R w_t)w_t.$$

In this equation w is a vector, t is iteration index, R is a covariance matrix, which is represented here as an R, but it is to be noted that in the block 340 the matrix T may replace the covariance matrix R as the iteration is applied, and α is a parameter. The iteration index is dropped in this exemplary embodiment. Iterations of the first variant of EVD may therefore be represented as for iter=1: numIters $w = R*w;$ $w = w - \text{Delta(iter)}*(w'^**wp)*wp;$ $w = w/\text{norm}(w);$ $wp = w;$ end Vector w may be initialized such that for each eigenpair an orthogonal vector compared to the initial value of the previous initial value is used. This may be achieved for example by using columns of an orthogonal matrix, such as Hadamard matrix of FFT matrix. Delta is a parameter to be optimized in this exemplary embodiment. In other words, in block 340, iterations of an exemplary variant of EVD are performed. The iteration applied may be any suitable iteration and herein one exemplary embodiment of such iteration, that may be applied, is described. In this exemplary embodiment of iterations, in one iteration round a vector is first multiplied with the covariant matrix. In other words, a matrix vector product is calculated. It is to be noted that calculating may also be understood as determining. Next, from the result of that multiplication, another multiplication is subtracted. This other multiplication includes multiplying a transpose of the vector to be multiplied with the vector obtained in the previous iteration that is then multiplied with a delta that is a parameter t be optimized, and the vector obtained in the previous iteration. In other words, a modified vector is calculated by scaled correlation with the vector form the previous iteration round. The result of the subtraction is then divided by a norm vector obtained from the result and thus a normalized vector that now becomes the new previous vector is obtained. In other words, a normalized vector is calculated and set as a vector form the previous round for the next iteration round.

Iterations for the second variant of EVD, which corresponds to S4 and block 340 may be based on an update rule $w_{t+1} = (I + \alpha R - \alpha w_t R w_t) w_t$ and may be represented as for iter=1: numIters $u = R*w;$ $t = \eta - w'H*u;$ $w = t*w + u;$ $w = w/\|w\|$ end In the representation above $\eta$ is a parameter to be optimized and its value may depend on the matrix size, number of iterations and the number of eigenpairs to be estimated. In other words, in the exemplary embodiment of an EVD estimation algorithm illustrated above, iterations are performed such that one iteration includes first determining a vector u that is a result of multiplying the covariant matrix and the vector w. Then a vector t is determined to be the result of first multiplying a transpose vector of the vector w with the determined vector u and the subtracting the result of the multiplication from the parameter $\eta$. Vector w is then determined to be the result of multiplying vector u and vector W and then adding to the result the vector u. Then in the final step a normalized vector is obtained by dividing the vector w by a norm of the vector w.

A third variant may be based on an adaptive step size that may be defined as $$\mu = \begin{cases} \dfrac{\|w\|^2}{\beta + \sqrt{\beta^2 + \|w\|^2}}, & \text{if } \beta \geq 0 \\ -\beta + \sqrt{\beta^2 + \|w\|^2}, & \text{else.} \end{cases}$$

In the equation above $$\beta = \dfrac{\left(\dfrac{w^H R w}{w^H w} - \dfrac{g^H R g}{g^H g}\right)}{\|g\|} \text{ and } g = \dfrac{2\left(Rw - \dfrac{w^H R w}{w^H w} w\right)}{w^H w}$$

is the gradient of the Rayleigh quotient $$\dfrac{w^H R w}{w^H w}.$$

Iterations for the third variant may be represented as for iter=1: numIters calculate g
   calculate $\beta$
   calculate $\mu$ $w = w + \mu g$ $w = w/\|w\|$ end In general, in this exemplary embodiment the EVD algorithm comprises iterations such that during one iteration, values for variables g, $\beta$, $\mu$ are first calculated. The calculations may be performed according to the equations above for example. Next, the vector w is determined to be the sum of vector w and the result of multiplying variables $\mu$ and g. Then the vector w is then normalized by dividing the vector w by the norm of vector w.

It is to be noted that in the iterations of the first, second and third values may be preceded by using one power iterations first.

Figure 4:
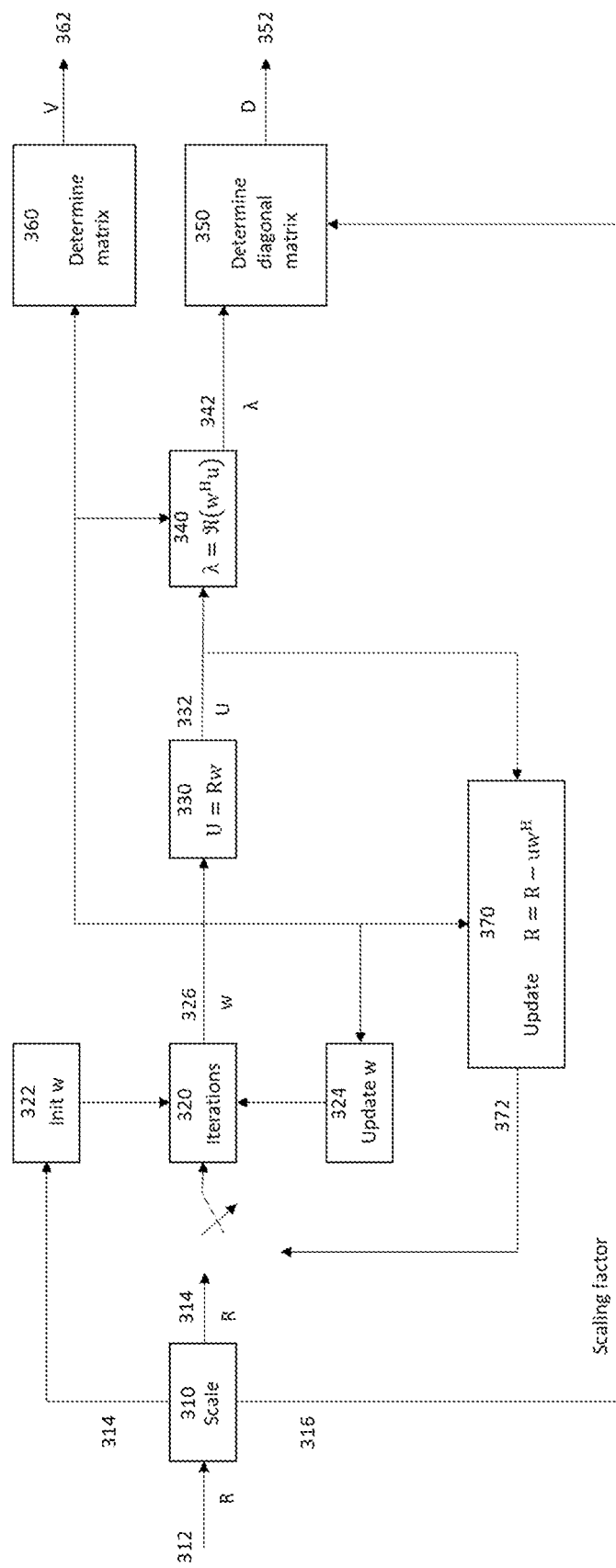

FIG. 4 illustrates a block diagram according to an exemplary embodiment of an approximate EVD algorithm. First input 312, which is the noise and interference covariance matrix R, is provided to block 310 that then scales the matrix R. For example, a norm may be used. The scaled matrix is then used as an input 318 to the block 320 in which iteration loops are then performed. Iterations may for example the iterations described above. In block 322 initial vector w is determined. The initial vector w may be for example the column of matrix R with the largest norm. The initial w is then also provided as an input to the iterations block 320 together with the scaled matrix R. The output 326 is then an eigenvector w. Then in block 330 a scaled matrix U is determined using the equation U=Rw. The output 332 of block 330 is therefore the scaled matrix U that is then provided as input to block 340 and block 370. In block 340 an eigenvalue is determined using the equation $\lambda = \Re(w^H u)$, and in block 370 the matrix R is update using the equation $R = R - uw^H$. It is to be noted that for the next iteration of determining the next eigenpair, an initial value of w is determined in block 324 and it may be determined as orthogonal to the previous:

$$w = \begin{bmatrix} w_1 & \ldots & w_{\frac{N}{2}} & -w_{\frac{N}{2}+1} & \ldots & -w_N \end{bmatrix}^T.$$

Alternatively, an orthogonal vector may be used to the initial value for the previous eigenvector.

The updated R and w are then used to determine the next eigenvalue and corresponding eigenvector. The final outputs are then output 362 and 352. In block 360, a matrix of eigenvectors V is determined. In the matrix of eigenvectors each column is an eigenvector. Input to the block 360 is the input 326. A diagonal matrix D is then determined in block 350 and the input to the block 350 are input 316, which is a scaling factor, and 342. The diagonal matrix D comprises eigenvalues which are scaled using the scaling factor that is used in block 310.

In an exemplary embodiment, an input matrix, such as a noise and interference covariance matrix R, is first scaled. After the scaling an initial vector is determined. Determining may also be understood as calculating. Next, multiple rounds of iterations are performed. The amount of iteration rounds may be pre-determined or set dynamically. After iterations, a vector is calculated. The vector is defined by the equation u=Rw. Next, an eigenvalue is calculated after which Matrix R and vector w are updated and the process described above may be repeated. The final outputs are calculated after executing the process. The final outputs may be matrix V with eigenvectors on columns and diagonal matrix of eigenvalues scaled by a scaling value.

In this exemplary embodiment, one iteration round performed as part of performing iterations step, comprises first calculating a matrix vector product. Then a modified vector is calculated by scaled correlation with the vector from previous iteration round. After that the vector is normalized and set as the previous vector for the next iteration round.

Figure 5:
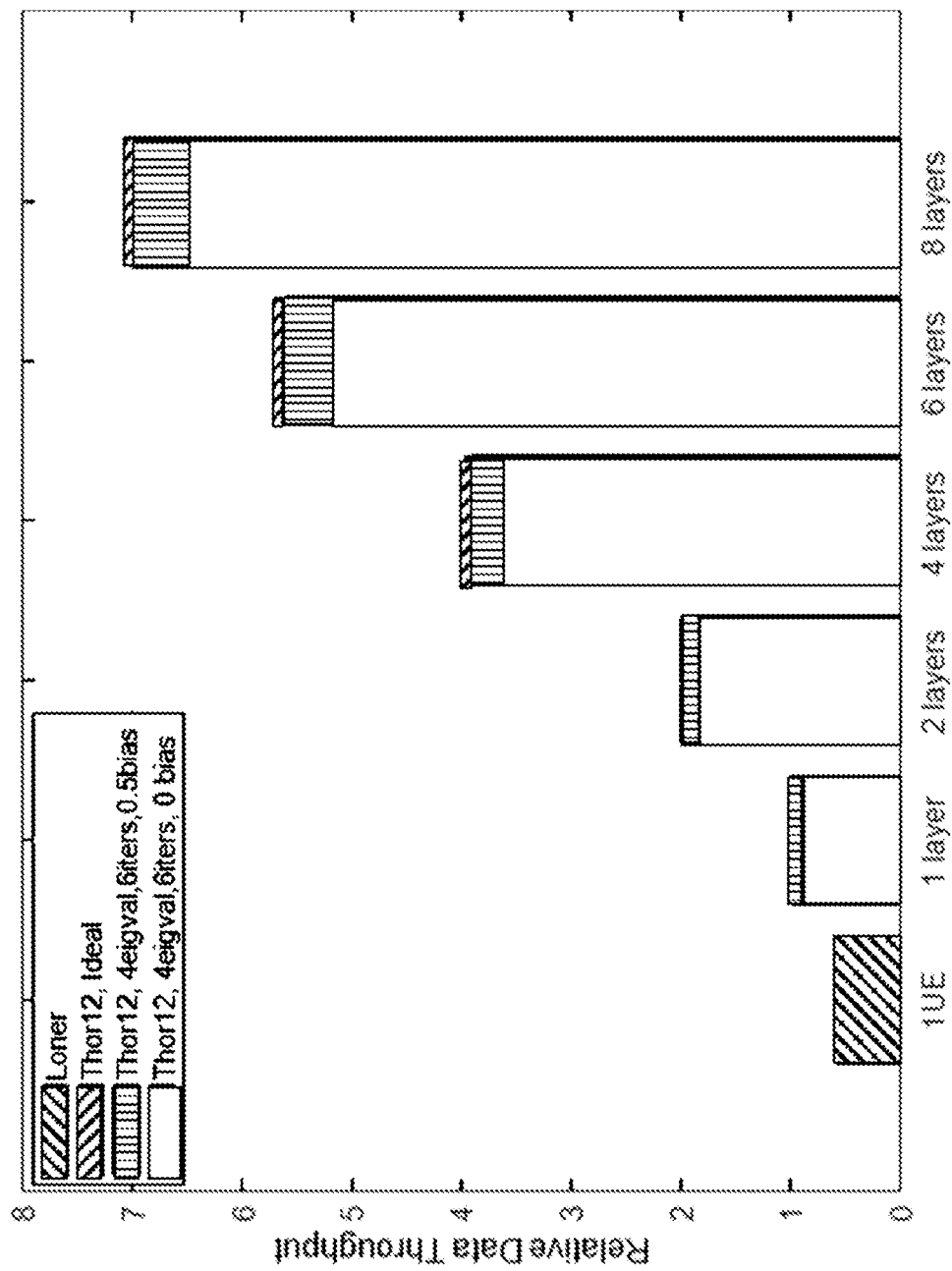
FIG. 5 and FIG. 6 illustrate results of performance when an exemplary embodiment is utilized.

The exemplary embodiments described above may have benefits such as achieving an improved performance while maintaining low complexity. FIG. 5 illustrates results of a performance when comparing to an original power method with 6 iterations. Performance is close to optimal as the additional gain from "Thor12; Ideal" is very small compared to the "Thor12; 4eigval; biters; 0.5bias". The EVD estimation algorithm (first variant) needs much less iterations than the original power method.

Figure 6:
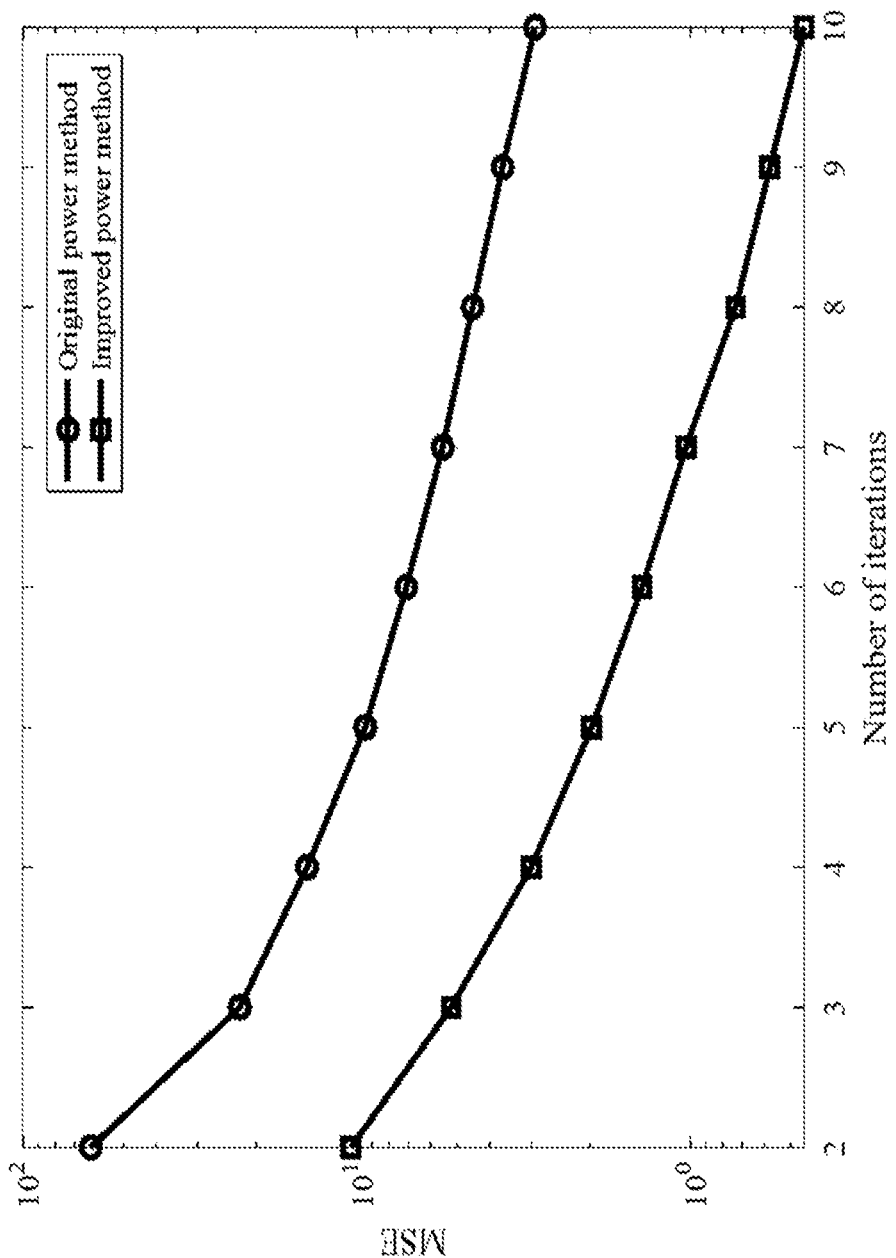

FIG. 6 illustrates another result of performance when an exemplary embodiment as described above is utilized compared to an original power method. The figure illustrates a mean squared error, MSE, of true eigenvalues and estimated eigenvalues (as function of number of iterations). When comparing the curve of the original power method, and the curve of the improved power method according to an exemplary embodiment described above, it can be noticed that the gain is substantial.

Figure 7:
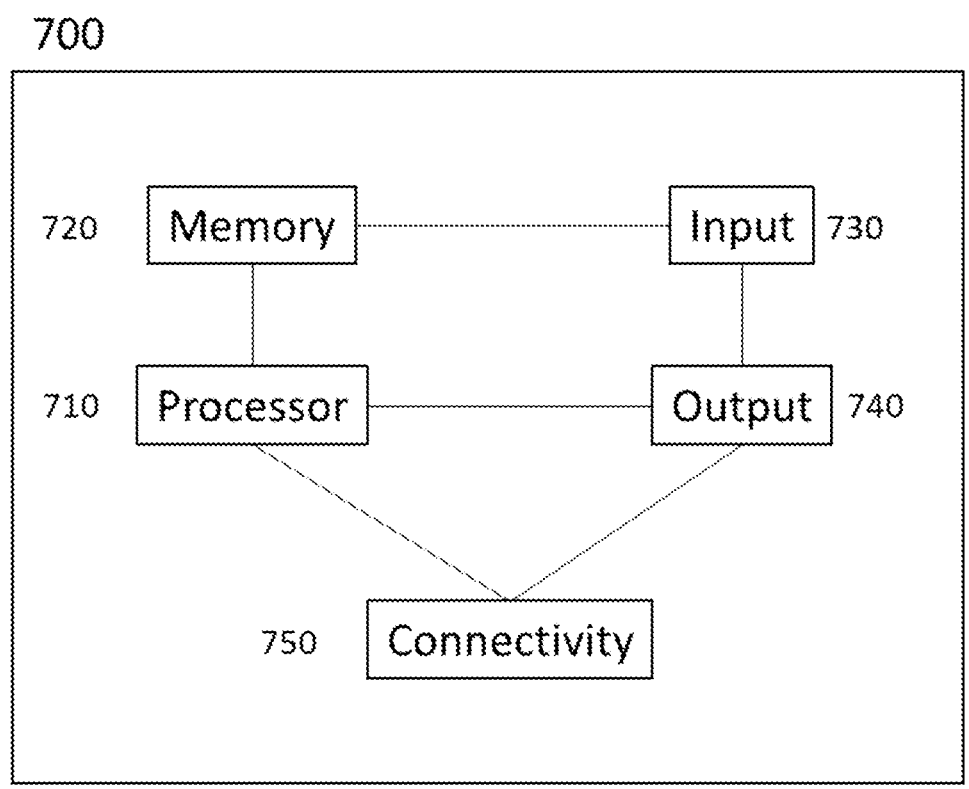
FIG. 7 illustrates an exemplary embodiment of an apparatus.

FIG. 7 illustrates an apparatus 700, which may be an apparatus such as, or comprised in, a receiver or a terminal device, according to an example embodiment. The apparatus 700 comprises a processor 710. The processor 710 interprets computer program instructions and processes data. The processor 710 may comprise one or more programmable processors. The processor 710 may comprise programmable hardware with embedded firmware and may, alternatively or additionally, comprise one or more application specific integrated circuits, ASICs.

The processor 710 is coupled to a memory 720. The processor is configured to read and write data to and from the memory 720. The memory 720 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 720 stores computer readable instructions that are execute by the processor 710. For example, non-volatile memory stores the computer readable instructions and the processor 710 executes the instructions using volatile memory for temporary storage of data and/or instructions.

The computer readable instructions may have been pre-stored to the memory 720 or, alternatively or additionally, they may be received, by the apparatus, via electromagnetic carrier signal and/or may be copied from a physical entity such as computer program product. Execution of the computer readable instructions causes the apparatus 700 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 700 further comprises, or is connected to, an input unit 730. The input unit 730 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 730 may comprise an interface to which external devices may connect to.

The apparatus 700 also comprises an output unit 740. The output unit comprises or is connected to one or more displays capable of rendering visual content such as a light emitting diode, LED, display and a liquid crystal display, LCD. The output unit 740 further comprises one or more audio outputs. The one or more audio outputs may be for example loudspeakers or a set of headphones.

The apparatus 700 may further comprise a connectivity unit 750. The connectivity unit 750 enables wired and/or wireless connectivity to external networks. The connectivity unit 750 may comprise one or more antennas and one or more receivers that may be integrated to the apparatus 700 or the apparatus 700 may be connected to. The connectivity unit 750 may comprise an integrated circuit or a set of integrated circuits that provide the wireless communication capability for the apparatus 700. Alternatively, the wireless connectivity may be a hardwired application specific integrated circuit, ASIC.

It is to be noted that the apparatus 700 may further comprise various component not illustrated in the FIG. 7. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, for use in a multiple input, multiple output receiver, the apparatus comprising at least one processor, and at least one memory including a computer program code, wherein the at least one memory and the computer program code are configured, with the at least one processor, to cause the apparatus to:
    obtain a noise and interference covariance matrix;
    perform scaling of the noise and interference covariance matrix;
    determine a sum of diagonal elements of the scaled noise and interference covariance matrix;
    perform a first spectral shift by the sum to the scaled noise and interference covariance matrix to obtain a first spectral shifted matrix;
    perform eigenvalue decomposition to the first spectral shifted matrix to obtain an eigenvalue matrix;
    perform a second spectral shift by the sum to the eigenvalue matrix;
    limit the eigenvalue matrix to a diagonal matrix; and
    obtain a new noise and interference covariance matrix, adding the scaled noise and interference covariance matrix and eigenvalue pairs that are obtained based, at least partly, on the performed eigenvalue decomposition, for use by the receiver to mitigate effects of interference signals and increase throughput.

2. The apparatus according to claim 1, wherein the eigenvalue decomposition is partial eigenvalue decomposition.

3. The apparatus according to claim 1, wherein the noise and interference covariance matrix is an estimated noise and interference covariance matrix.

4. The apparatus according to claim 1, wherein the eigenvalue decomposition comprises:
    scaling the first spectral shifted matrix;
    performing one or more iterations to the scaled first spectral shifted matrix based using an input vector to obtain an eigenvector;
    multiplying the scaled first spectral shifted matrix by the eigenvector and determining an eigenvalue based on the multiplying;
    determining a matrix of multiple eigenvectors based on the one or more iterations; and
    determining a diagonal matrix comprising the eigenvalue.

5. The apparatus according to claim 4, wherein the input vector is an initial eigenvector during a first iteration and an eigenvector obtained from a previous iteration after the first iteration.

6. The apparatus according to claim 4, wherein the eigenvalue decomposition further comprises obtaining an updated scaled first spectral shifted matrix based on the multiplying and performing a subsequent iteration to the updated scaled first spectral shifted matrix using the input vector.

7. The apparatus according to claim 1, wherein the apparatus is comprised in a terminal device.

8. A computer-implemented method for use in a multiple input, multiple output receiver, the computer-implemented method comprising:
    obtaining a noise and interference covariance matrix;
    performing scaling of the noise and interference covariance matrix;
    determining a sum of diagonal elements of the scaled noise and interference covariance matrix;
    performing a first spectral shift by the sum to the scaled noise and interference covariance matrix to obtain a first spectral shifted matrix;
    performing eigenvalue decomposition to the first spectral shifted matrix to obtain an eigenvalue matrix;
    performing a second spectral shift by the sum to the eigenvalue matrix;
    limiting the eigenvalue matrix to a diagonal matrix; and
    obtaining a new noise and interference covariance matrix, adding the scaled noise and interference covariance matrix and eigenvalue pairs that are obtained based, at least partly, on the performed eigenvalue decomposition, for use by the receiver to mitigate effects of interference signals and increase throughput.

9. The computer-implemented method according to claim 8, wherein the eigenvalue decomposition is partial eigenvalue decomposition.

10. The computer-implemented method according to claim 8, wherein the noise and interference covariance matrix is an estimated noise and interference covariance matrix.

11. The computer-implemented method according to claim 8, wherein the eigenvalue decomposition comprises:
    scaling the first spectral shifted matrix;
    performing one or more iterations to the scaled first spectral shifted matrix based using an input vector to obtain an eigenvector;
    multiplying the scaled first spectral shifted matrix by the eigenvector and determining an eigenvalue based on the multiplying;
    determining a matrix of multiple eigenvectors based on the one or more iterations; and
    determining a diagonal matrix comprising the eigenvalue.

12. The computer-implemented method according to claim 11, wherein the input vector is an initial eigenvector during a first iteration and an eigenvector obtained from a previous iteration after the first iteration.

13. The computer-implemented method according to claim 11, wherein the eigenvalue decomposition further comprises obtaining an updated scaled first spectral shifted matrix based on the multiplying and performing a subsequent iteration to the updated scaled first spectral shifted matrix using the input vector.

14. A non-transitory computer-readable medium comprising instructions for causing an apparatus, wherein the apparatus is for use in a multiple input, multiple output receiver, to perform at least the following:
    obtaining a noise and interference covariance matrix;
    performing scaling of the noise and interference covariance matrix;
    determining a sum of diagonal elements of the scaled noise and interference covariance matrix;
    performing a first spectral shift by the sum to the scaled noise and interference covariance matrix to obtain a first spectral shifted matrix;
    performing eigenvalue decomposition to the first spectral shifted matrix to obtain an eigenvalue matrix;
    performing a second spectral shift by the sum to the eigenvalue matrix;
    limiting the eigenvalue matrix to a diagonal matrix; and
    obtaining a new noise and interference covariance matrix, adding the scaled noise and interference covariance matrix and eigenvalue pairs that are obtained based, at least partly, on the performed eigenvalue decomposition, for use by the receiver to mitigate effects of interference signals and increase throughput.

15. The non-transitory computer-readable medium according to claim 14, wherein the eigenvalue decomposition comprises:
scaling the first spectral shifted matrix;
performing one or more iterations to the scaled first spectral shifted matrix based using an input vector to obtain an eigenvector;
multiplying the scaled first spectral shifted matrix by the eigenvector and determining an eigenvalue based on the multiplying;
determining a matrix of multiple eigenvectors based on the one or more iterations; and
determining a diagonal matrix comprising the eigenvalue.

* * * * *